US006861006B2

(12) United States Patent
Ferain et al.

(10) Patent No.: US 6,861,006 B2
(45) Date of Patent: Mar. 1, 2005

(54) METHOD FOR CREATING PORES IN A POLYMER MATERIAL

(75) Inventors: Etienne Ferain, Masnuy Saint Jean (BE); Roger Legras, Lens-Saint-Remy (BE); Kamel Ounadjela, Gentilly (FR)

(73) Assignee: Universite Catholique de Louvain, Louvain-la-Neuve (BE)

( * ) Notice: Subject to any disclaimer, the term of this patent is extended or adjusted under 35 U.S.C. 154(b) by 36 days.

(21) Appl. No.: 10/186,201

(22) Filed: Jun. 27, 2002

(65) Prior Publication Data

US 2003/0087083 A1 May 8, 2003

Related U.S. Application Data

(63) Continuation of application No. PCT/EP00/13406, filed on Dec. 29, 2000.

(30) Foreign Application Priority Data

Dec. 29, 1999 (FR) .............................................. 99 16655

(51) Int. Cl.[7] .............................. B31D 3/00; B44C 1/22; C03C 15/00; C23F 1/00; B29C 39/00
(52) U.S. Cl. ............................ 216/56; 216/87; 264/413
(58) Field of Search ............................ 216/56, 55, 87, 216/94; 264/423–425, DIG. 48; 521/53, 61

(56) References Cited

U.S. PATENT DOCUMENTS 3,303,085 A * 2/1967 Price et al.
3,415,993 A * 12/1968 Fleischer et al.
3,612,871 A * 10/1971 Crawford et al.
3,662,178 A * 5/1972 Caputi et al.
3,713,921 A 1/1973 Fleischer et al.
3,742,182 A 6/1973 Saunders
3,770,532 A * 11/1973 Bean et al.
3,802,972 A * 4/1974 Fleis Cher et al.
3,852,134 A 12/1974 Bean
4,652,412 A 3/1987 Chiulli
4,832,997 A * 5/1989 Balanzat et al.
4,855,049 A 8/1989 Toulemonde et al.
4,872,888 A * 10/1989 Ehrfeld et al.
4,923,608 A 5/1990 Flottmann et al.
4,956,219 A 9/1990 Legras et al.
5,234,538 A 8/1993 Luck

FOREIGN PATENT DOCUMENTS

| DE | 4 319 610 | 1/1994 |
| WO | WO 87/05850 | 10/1987 |
| WO | WO 98/30317 | 7/1998 |

\* cited by examiner

Primary Examiner—Gregory Mills
Assistant Examiner—Roberts Culbert
(74) Attorney, Agent, or Firm—Harness, Dickey & Pierce, P.L.C.

(57) ABSTRACT

The invention relates to a method of creating pores in a polymer material in sheet form or a polymer layer such as a thin film with a thickness equal to around 100 nanometers, previously deposited on a metallic base. The invention further relates to a method of creating pores in a polymer material in sheet form, such as polycarbonate or any other equivalent material, the said method making it possible to obtain porous areas with controllable sizes and shapes, these areas being distributed according to densities and locations which can also be controlled.

21 Claims, 2 Drawing Sheets

METHOD FOR CREATING PORES IN A POLYMER MATERIAL

CROSS-REFERENCE TO RELATED APPLICATIONS

This present application is a continuation of PCT Serial No. PCT/EP00/13406, filed Dec. 29, 2000, claiming priority to French Application Serial No. 99/16655, filed Dec. 29, 1999, both of which are incorporated by reference herein.

FIELD OF THE INVENTION

The invention relates to a method of creating pores in a polymer material in sheet form or a polymer layer such as a thin film with a thickness equal to around 100 nanometers, previously deposited on a metallic base. The invention relates more particularly to a method of creating pores of nanometric to micrometric size in a polymer material such as polycarbonate in sheet form or any other equivalent material and to the use of such microporous sheets, notably for producing filtration membranes and/or for connecting filaments to an electronic circuit previously written on a base. The invention also relates to the microporous membranes obtained by the said method, the membranes being able to have porosity areas with a diameter of around 10 $\mu$m.

BACKGROUND AND SUMMARY OF THE INVENTION

Various methods of creating pores with a small cross-section in sheets of polymer material are already known in the prior art, for example with a view to producing microporous membranes for the purification or filtering of industrial or biological fluids, or for water treatment. These methods can be grouped together according to three major types:

- a first, mechanical, type of method comprising at least one stamping step, as described for example in the document U.S. Pat. No. 4,652,412;
- a second type of method, comprising at least one irradiation using a $CO_2$ or NdYAG infrared laser or pulsed laser, as described for example in the documents U.S. Pat. No. 4,923,608, U.S. Pat. No. 3,742,182, WO-A-98 30317;
- a third type of method, comprising at least one ion irradiation followed by a chemical etching.

The method according to the invention for creating pores in a material such as polycarbonate in sheet form belongs to the third general type presented above. For this type of pore creation method, with a view to producing filtration membranes, reference can be made for example to the following documents: DE-A-4 319 610, U.S. Pat. No. 5,234, 538, U.S. Pat. No. 3,713,921. The document U.S. Pat. No. 4,956,219, from the applicant, describes a method of creating pores in a material chosen from amongst the group comprising saturated polyesters such as ethylene polyterephthalate, carbonic acid polyesters such as polycarbonate produced from bis-phenol A (bis(hydroxy-4 phenol)-2,2 propane), aromatic polyethers, polysulphones, polyolefins, cellulose acetates and cellulose nitrates. The material is bombarded by a beam of ions preferably issuing from rare gases such as argon, with an energy of around 2 MeV per nucleon, the density of ions passing through the polymer film being between $10^4$ and $10^{13}$ ions per square centimeter. Such beams can be obtained by means of particle accelerators such as cyclotrons with separate sectors. The material is in the form of a strip moving substantially perpendicular to the beam of ions, the thickness of the strip being from around a few microns to 100 microns, the width of the strip being between 5 and 150 centimeters. By magnetic deflection, the beam of ions effects a sinusoidal sweep, each portion of the strip being bombarded on several occasions so that an even density of pores is obtained over the entire strip of material treated. After bombardment, the strip of material is possibly subjected to ultraviolet (UV) radiation. After this UV treatment or directly after ion bombardment, a chemical treatment is effected in a corrosive solution containing an organic solvent. Thus, for example, the strip of material is immersed in a solution of caustic soda containing methanol, ethanol or isopropanol. The ion bombardment and/or the chemical treatment can be carried out continuously, possibly one directly after the other, the strip of material which passed opposite the beam being driven continuously in the corrosive solution. After neutralisation, rinsing and drying, a continuous strip of microporous polymer material is obtained.

The document U.S. Pat. No. 3,852,134 describes a method for the ion bombardment of polycarbonate film with a thickness of less than 20 microns, followed by exposure to radiation with a wavelength of less than 4000 angstroms, under oxygen, before a first chemical etching, after baking and second chemical etching with a view to obtaining pores with diameters of between 1000 and 100,000 angstroms. The preferential etching methods in directions defined by molecular structure defects resulting from an ion bombardment make it possible to produce filtering membranes with a greater quality than the membranes resulting from other methods such as stamping or laser treatment. However, controlling the density, shape and size of the pores obtained is still tricky. Thus for example there is a probability that one or more pores may pass completely through the membrane which, in some applications, may be detrimental. To reduce this risk, a method of bombardment on both faces of the membrane is proposed in the document U.S. Pat. No. 4,855,049. This method does however result in an unfavourable hydromechanical behaviour in some cases, because of the great convolution obtained for the fluid passages. It has also been found that the pores are of variable diameter from the surface towards the heart of the membrane, thus having a "cigar" shape (for polycarbonate membranes, see Sch önenberger et al., J. Phys. Chem. B101, p. 5497–5505, 1997). This in particular interferes with a good prediction of the properties of these membranes merely looking at their surface, for example with a scanning electron microscope. The cause of this shape of the pores is still being discussed.

The document U.S. Pat. No. 3,713,921 presents the use of a surfactant added to the etching reagent in order to attenuate these variations in shape and transverse dimension of the pores. Some authors invoke an influence of the thickness of the membrane and imperfect control of the etching conditions in order to explain the "cigar" shape of the pores.

The invention relates to a method of creating pores in a polymer material in sheet form, such as polycarbonate or any other equivalent material, the said method making it possible to obtain porous areas with controllable sizes and shapes, these areas being distributed according to densities and locations which can also be controlled. According to one embodiment, the method also allows, within the said areas, the formation of pores of a cylindrical shape overall, without any depreciable variation in average diameter of these pores in the thickness of the sheets of polymer material treated. The invention also concerns the microporous membranes produced from the said treated sheets of polymer material.

The invention relates, according to a first aspect, to a method for creating pores with a nanometric to micrometric size in a polymer material in a thin sheet which can be supported, comprising an ion bombardment followed by chemical etching, the said method comprising a step of global heat treatment providing partial deactivation of the traces formed in the polymer material by the ion bombardment, and a step of selective irradiation of the polymer film, steps which take place after the ion bombardment and before the chemical etching.

In another embodiment, the global heat treatment and the selective irradiation of the bombarded polymer material are carried out simultaneously. In one embodiment, the selective irradiation is effected after the heat treatment of the bombarded polymer material. In another embodiment, the selective irradiation is effected by means of a UV source and through a mask. In another embodiment, the selective irradiation is effected by means of a UV laser beam. According to one particular embodiment, a step of pre-etching of the polymer material is carried out prior to the ion bombardment, this pre-etching reducing the thickness of the sheet of polymer material.

The polymer material is chosen from the group comprising saturated polyesters such as ethylene polyterephthalate, carbonic acid polyesters such as polycarbonate produced from bis-phenol A (bis(hydroxy-4 phenol)-2,2 propane), aromatic polyethers, polysulphones, polyolefins, cellulose acetates and cellulose nitrates. The sheet of polymer material initially has, and in particular before any pre-etching, a thickness of between a few microns and around a hundred microns. The pre-etching is carried out until the ablation of a thickness of between 0.5 microns and 3 microns approximately on each face of the said sheet. According to a particular embodiment, the polymer material is an amorphous polycarbonate approximately 25 microns thick before pre-etching. According to another particular embodiment, the polymer material is a crystalline polycarbonate with a thickness of approximately 10 microns. The ion bombardment is performed by a beam of ions preferably issuing from rare gases such as argon, with an energy of around 2 MeV per nucleon, the beam having an intensity of between $10^6$ and $10^{13}$ ions per second.

In one embodiment, the chemical etching is said to be slow and is carried out in a bath containing 0.5 N caustic soda in aqueous solution, at a temperature of approximately 70° C., for approximately 260 min. In another embodiment, the chemical etching is said to be fast and is carried out in a bath containing 2 N caustic soda, in aqueous solution, at a temperature of approximately 70° C., for approximately 30 min. The chemical etching bath comprises, in one embodiment, an organic solvent chosen from amongst the group comprising methanol, ethanol and isopropanol. The chemical etching is carried out in the presence of a surfactant. The microporous films obtained after chemical etching are washed until the pH is neutralised, rinsed and dried. The washing of the microporous film is carried out in an aqueous solution of acetic acid at approximately 15%, at a temperature of approximately 70° C. for approximately 15 minutes; then in demineralised water, at a temperature of approximately 70° C., for approximately 15 minutes and more, until a neutral pH is obtained.

The method for creating pores described above is carried out continuously. The invention relates, according to a second aspect, to a microporous film of polymer material produced by implementing the method presented above. The microporous film is used as a matrix with a view to producing micrometric filaments of metal or polymer.

BRIEF DESCRIPTION OF THE DRAWINGS

Other objects and advantages of the invention will emerge during the following description of embodiments, a description which will be effected with reference to the accompanying drawings, in which.

DETAILED DESCRIPTION OF THE INVENTION

Figure 1:
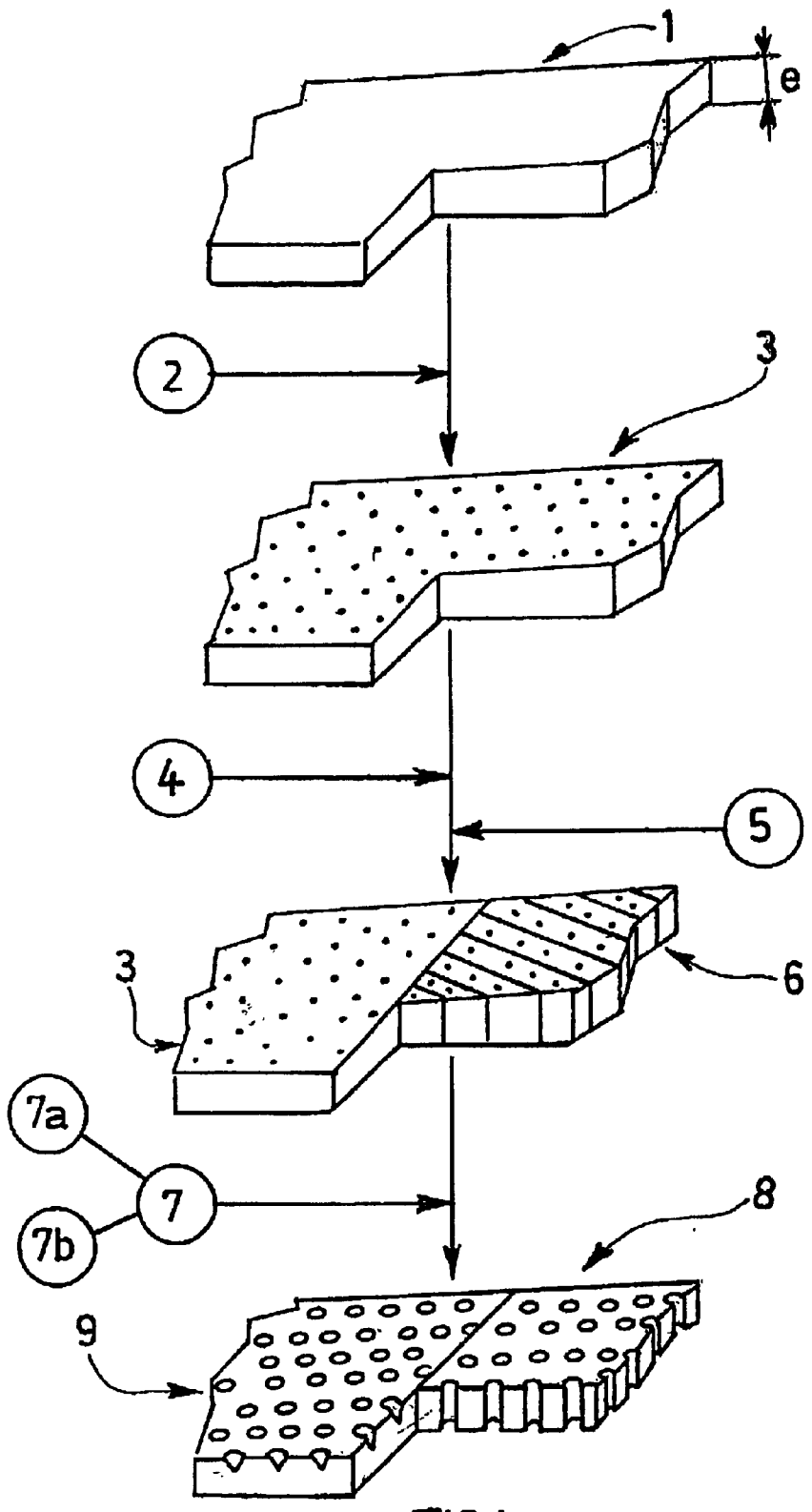
FIG. 1 is a schematic diagram depicting the successive steps of a method of creating pores in a polymer material in sheet form, according to a first embodiment of the invention.

Reference is made first of all to FIG. 1. The method of creating pores in an initial polymer film 1, as shown schematically in FIG. 1, comprises four successive steps:

an ion bombardment 2 of the film 1, producing a bombarded film 3;

a global heat treatment 4 of the bombarded film 3;

a selective irradiation 5 of the bombarded film 3 producing an irradiated film 6;

a chemical etching 7 of the irradiated film 6.

The initial polymer film 1 can be produced from a material chosen from amongst a group comprising saturated polyesters such as ethylene polyterephthalate, carbonic acid polyesters such as polycarbonate produced from bis-phenol A (bis(hydroxy-4 phenol)-2,2 propane), aromatic polyethers, polysulphones, polyolefins, cellulose acetates and cellulose nitrates.

In the remainder of the description, only the results obtained with polycarbonate will be described. Two grades of polycarbonate produced from bis-phenol A will be considered: a crystalline polycarbonate (referred to as PCc hereinafter, for the purpose of simplification) and an amorphous polycarbonate (referred to as PCa hereinafter). As PCc, a 10 micron thick film, sold under the brand name Makrofol™ by Bayer, is used in the following detailed examples. This Makrofol™ film is produced by moulding, crystallisation and longitudinal stretch forming. As PCa, a 25 micron thick film, sold under the brand name Lexan™ by General Electric, is used in the following detailed examples. This Lexan™ film comprises crystallites of size so small that it is of very high transparency in natural light. In certain particular embodiments, a pre-etching of the film is carried out before ion bombardment. The ion bombardment 2 is carried out, in one embodiment, by means of a beam of ions preferably issuing from rare gases such as argon, with an energy of around 2 MeV per nucleon, the beam having an intensity of between $10^6$ and $10^{13}$ ions per second. Such beams can be obtained by means of particle accelerators such as cyclotrons with separate sectors. The film to be bombarded, pre-etched or not, is, in one embodiment, in the form of a strip passing substantially perpendicular to the beam of ions, the thickness (e) of the strip being around a few hundreds of a nm at 100 microns, the width of the strip being between 5 and 150 centimeters.

In another embodiment, the polymer film, with a thickness (e) which may vary from a few nanometers to a few hundreds of nanometers, is deposited on a base (not shown). By magnetic deflection or any other equivalent method, the beam of ions performs a sinusoidal sweep, each portion of the strip being irradiated on several occasions so that an even density of pores is obtained over the entire strip of bombarded film. After it has cooled, the bombarded film 3 is subjected to:

a global heat treatment 4, so that the structural defects or "traces" formed in the polymer film during the ion bombardment are less sensitive to the chemical etching;

a selective irradiation 5 of the heat-treated bombarded film 3 reactivates some traces and makes them more sensitive to the subsequent chemical etching 7;

a chemical etching 7, performed in a corrosive solution containing an organic solvent.

The heat treatment 4 is carried out at a temperature of between room temperature and approximately 200° C., for a time less than a few tens of minutes. When the polymer film is made from polycarbonate, the heat treatment 4 is carried out at approximately 150° C. The irradiation 5 can be performed for a very short time, using a laser beam, or much longer, around several hours, for a less intense energy source. In one embodiment, the irradiation 5 is performed employing a wavelength of around 360 nm, for a power which may attain around 10 millijoules per square micrometer. Thus, for example, the selectively irradiated film 6 is immersed in a solution of caustic soda containing methanol, ethanol or isopropanol. The steps of ion bombardment 2, heat treatment 4, selective irradiation 5 and chemical etching 7 can be carried out continuously, possibly one directly after the other. After neutralisation, rinsing and drying, a continuous film of microporous polymer material 8 is obtained. The non-porous membrane 9 results from the membrane 3 which has undergone the heat treatment 4 and then the chemical etching 7, but which has not undergone irradiation 5. In a variant embodiment of the chemical etching 7, a surfactant is added to the soda solution in order to improve the wetting of the irradiated film 6 during the etching 7.

As stated above, the conventional implementation of the chemical etching methods 7 for polymer films which have undergone an ion bombardment 2 results in the formation of pores of variable diameter from one edge to the other of these films. The inventors have carried out thorough investigations in order both to propose an explanation for this irregular form of the pores and to propose a method of manufacturing microporous polymer films in which the pores have a cylindrical shape overall.

The experimental results obtained will be presented below with reference to embodiments of the invention. An initial film of PCc of Makrofol™ make, 10 microns thick (e), and an initial film of PCa of Lexan™ make were each subjected to a light pre-etching Preal and an intense pre-etching Preai, so as remove a thickness of 0.5 microns and 2.0 microns on each face of the films respectively. The thicknesses removed were measured by gravimetric analysis. The pretreated films were then subjected to an ion bombardment 2 at the Cyclotron Research Centre at Louvain-la-Neuve. $Ar^{9+}$ ions were used, at an acceleration voltage of 5.5 MeV/AMU. The bombarded films 3 were then subjected to a heat treatment 4 (150° C. for 15 min) and to an ultraviolet irradiation 5 through a mask (not shown). The irradiated films 6 were next subjected to a chemical etching according to two modes:

a so-called "slow" chemical etching 7a, in a bath containing 0.5 N caustic soda in aqueous solution, at a temperature of approximately 70° C. for approximately 260 min;

a so-called "fast" chemical etching 7b, in a bath containing 2 N caustic soda in aqueous solution at a temperature of approximately 70° C. for approximately 30 min.

In the two cases of chemical etching 7a, 7b, a surfactant was added to the solution in order to increase the wetting of the irradiated film 6 during the etching. After the chemical etching 7a, 7b, the microporous films 8 obtained were washed: in an aqueous solution of acetic acid at approximately 15%, at a temperature of approximately 70° C., for approximately 15 minutes; then in demineralised water at a temperature of approximately 70° C. for approximately 15 minutes and more, until a neutral pH was obtained. The films were then coated with polyvinylpyrrolidone or PVP in order to increase their hydrophilic character, then dried in warm air.

Figure 2:
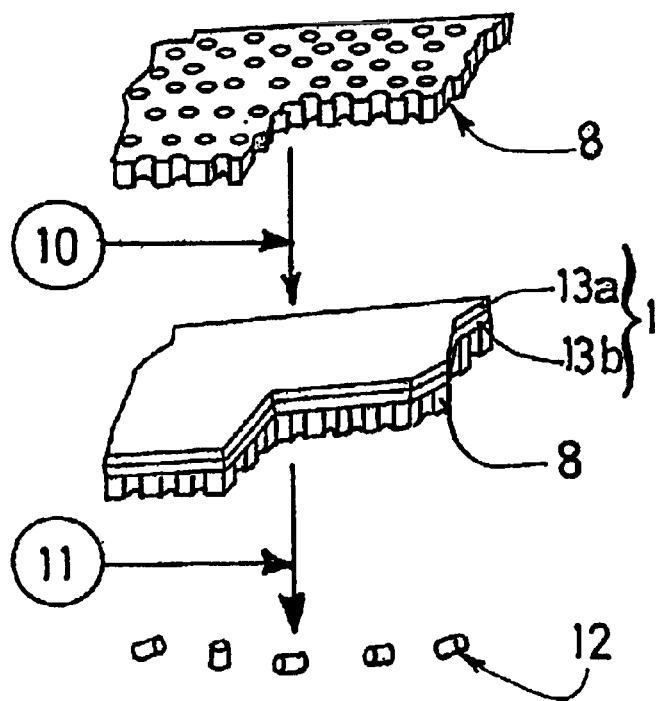
FIG. 2 is a schematic diagram depicting the successive steps of a method of manufacturing metallic filaments, a manufacturing method using the polymer material in sheet form treated in accordance with the pore creation method as shown schematically in FIG. 1.
Figure 3:
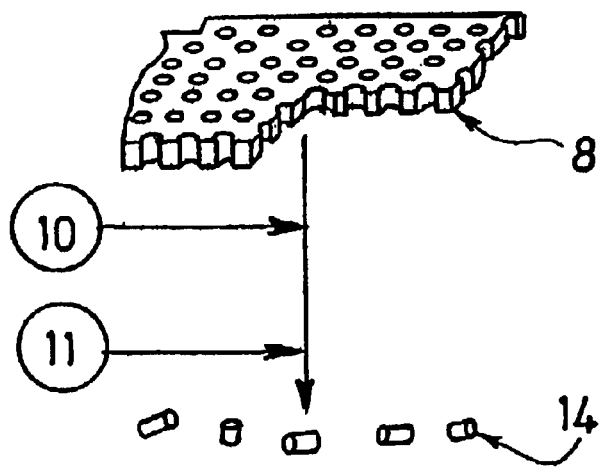
FIG. 3 is a schematic diagram depicting the successive steps of a method of manufacturing polymer filaments, a manufacturing method using the polymer material in sheet form treated in accordance with the pore creation method as shown schematically in FIG. 1.

Reference is now made to FIGS. 2 and 3. The microporous films 8 were then subjected to an electrolysis 10 performed in an electrochemical cell with three electrodes, at room temperature, such as a galvanoplasty cell, with a compartment made from Teflon™ with a counter-electrode made from platinum and a reference electrode made from calomel. A metallic twin layer 13, serving as electrodes, is applied to one of the faces of the microporous film 8. This twin layer 13 comprises:

a first adhesion layer 13b of chromium, 10 to 20 nm thick, directly applied to one of the faces of the microporous film 8;

a second layer 13a of gold, 500 nm to 1 micron thick, applied to the first layer 13b and in direct contact with the atmosphere.

The electrolysis 10 is carried out for example:

with a solution comprising 50 g/l of $CoSO_4$ and 30 g/l of $H_3BO_3$, at a potential difference of −0.1 V, to produce metallic filaments 12;

with a solution comprising 0.1 M of pyrrole and 0.1 M of $LiClO_4$, at a potential difference of +0.8 V, producing polymer filaments 14.

At the end of the galvanoplasty, the polycarbonate matrix of the microporous films was dissolved during step 11 in dichloromethane. The filaments 12 or 14 obtained can be filtered by means for example of a silver membrane. The microporous polymer films 8 and the filaments 12 or 14 obtained were observed under a field effect electron microscope (DSM 982 Gemini from the company LEO). Images with a satisfactory resolution were obtained for magnifications ranging up to 200,000, at an acceleration voltage of 400 V, without metallic deposition on the samples to be observed. The following parameters were measured:

mean diameter of the filaments, half-way along (MWD);

mean diameter of the pores on the surface of the microporous film 8 (MPS).

A calibration using nanospheres (Calibrated nanospheres™ from Duke Scientific Corp.) with a mean diameter of 30 nm was carried out in advance. By small angle X-ray diffraction (SAXS), a measurement of the distribution of the sizes of pores contained in the microporous membranes 8 was carried out (E. Ferain, R. Legras, Nuclear Instruments and Methods in Physics Research B131, 1997, p. 97). An average pore size value (APS) and a standard deviation in the distribution of the pore diameters were derived from these measurements of intensity of the diffracted beam as a function of the diffraction angle.

The study of the variations in the parameters MWD, MPS and APS specified above, as a function of the chemical etching time, for slow and fast attacks on a PCc film of the Makrofol™ type showed that:

the filaments obtained have MWD diameters greater than the size of the pores on the surface of the microporous films 8, whether the chemical etching be slow or fast and whatever the etching time in question, the filaments obtained have a toothpick shape;

the difference between the diameter values of the MWD filaments and the MPS diameters of the pores on the surface of the microporous film 8 is lower than for the slow chemical etching 7a and for the fast chemical etching 7b (approximately 15 nm as against approximately 30 nm);

the variations in the MPS and MWD values, as a function of the etching time, are similar, for a given type of etching 7a, 7b;

the average pore diameter values in the PCc film, after slow etching 7a, measured by SAXS, are between the values of the diameters of the filaments half-way along MWD and the values of the diameters of the pores on the surface of the film MPS.

The study of the variation in the parameters MWD, MPS, as a function of the etching time, for a fast etching 7b of a PCa film of the Lexan™ type, for films which have undergone a light pre-etching Preal and for non pre-etched films, showed that:

a light pre-etching Preal reduces the difference between the values of the diameters of the filaments MWD and the values of the diameters MPS of the pores on the surface of the microporous films 8, compared with a non pre-etched film (approximately 30 nm as against approximately 10 nm);

the pre-etching does not modify the rate of variation in MPS or MWD as a function of the etching time.

The study of the variations in the parameters MWD, MPS and APS, as a function of the etching time, for a slow etching 7a of a PCa film of the Lexan™ type, for films which have undergone an intense pre-etching Preai, showed that the variations in the parameters MWD, MPS and APS are substantially merged, for a given slow etching time range 7a, so that the pores formed in the film can be considered to be cylindrical.

The polyamide filaments 14 obtained after electrolytic deposition (step 10) in the pores of a PCa film which has undergone an intense pre-etching Preai and dissolution (step 11) of this polycarbonate film also have a very regular cylindrical shape. The filaments obtained from PCa have a lower roughness than those obtained from PCc. This observation must probably be correlated with the greater size of the crystallites in the Makrofol™ type PCc films than in the Lexan™ type PCa films used here, resulting in irregularities in the chemical etching paths forming the pores.

The pores obtained for PCa films which have undergone an intense pre-etching Preai have distributions of average diameters with standard deviations lower than those obtained for the pores in the PCc films. The losses of thickness measured by gravimetric analysis, for increasing etching times of films of PCa, PCc and PCa strongly pre-etched, not subjected to ion bombardment 2, are substantially identical for the first two microns of thickness of the films. Consequently there does not appear to exist any surface layer more resistive to chemical etching 7, unlike the assumptions sometimes adopted in the literature.

Overall, the experimental results presented above made it possible to establish a high positive influence of a pre-etching of the films before ion bombardment 2, this pre-etching making it possible to obtain pores which are substantially cylindrical rather than in the shape of "toothpicks" or "cigars" as in the prior methods. The precise origin of this influence of the pre-etching remains indeterminate. The geometry of the pores obtained makes it possible to produce nanofilaments or nanotubes of metal or polymer, these filaments being able to have a smooth surface and a cylindrical shape over lengths varying between a few nanometers and several tens of microns. Such nanofilaments or nanotubes are of very great interest for electronic, optical or biomedical applications for example. Moreover, the precise control of the three-dimensional porosity in polymer films makes it possible to produce filters which are very useful in the medical fields or in water treatment.

The method of the invention can also find an application in the field of connector engineering. The placing of a sheet of polymer, for example 100 nanometers thick, on an electronic circuit itself placed on a substrate, and the application of the method described above to the said polymer, allows the connection of the nanofilaments to the said electronic circuit.

What is claimed is:

1. A method of creating pores of nanometric to micrometric size in a polymer material in the form of thin film able to be supported, the method comprising:

an ionic bombardment followed by a chemical etching; and further comprising a step of global heat treatment and a step of selective irradiation of the polymer film which takes place after the ion bombardment and before the chemical etching;

wherein the global heat treatment and the selective irradiation of the bombarded polymer material are carried out simultaneously.

2. A method of creating cores of nanometric to micrometric size in a polymer material in the form of thin film able to be supported, the method comprising:

an ionic bombardment followed by a chemical etching; and further comprising a step of global heat treatment and a step of selective irradiation of the polymer film which takes place after the ion bombardment and before the chemical etching;

wherein the selective irradiation is carried out after the heat treatment of the bombarded polymer material.

3. The method according to claim 1, wherein the selective irradiation is carried out by means of a UV source and through a mask.

4. The method according to claim 1, wherein the selective irradiation is carried out by means of a UV laser beam.

5. The method according to claim 1, further comprising a step of pre-etching of the polymer material, prior to the ionic bombardment, thereby reducing the thickness of the sheet of polymer material.

6. The method according to claim 1, wherein the polymer material is selected from the group of saturated polyesters such as ethylene polyterephthalate, carbonic acid polyesters such as polycarbonate produced from bis-phenol A (bis (hydroxy-4 phenol)-2,2 propane), aromatic polyethers, polysulphones, polyolefins, cellulose acetates and cellulose nitrates.

7. The method according to claim 6, wherein the sheet of polymer material has, initially and in particular before any pre-etching, a thickness of between a few microns and around a hundred microns.

8. The method according to claim 5, wherein the pre-etching is carried out until the ablation of a thickness of between 0.5 microns and 3 microns approximately on each face of the said sheet.

9. The method according to claim 1, wherein the polymer material is an amorphous polycarbonate with a thickness of approximately 25 microns before pre-etching.

10. The method according to claim 1, wherein the polymer material is a crystalline polycarbonate with a thickness of approximately 10 microns before pre-etching.

11. The method according to claim 1, wherein the ion bombardment is performed by a beam of ions preferably issuing from rare gases such as argon, with an energy of around 2 meV per nucleon, the beam having an intensity of between $10^6$ and $10^{13}$ ions per second.

12. The method according to claim 1, wherein the chemical etching is slow and is carried out in a bath containing 0.5 N caustic soda, in aqueous solution, at a temperature of approximately 70° C., for approximately 260 min.

13. The method according to claim 1, wherein the chemical etching is rapid and is carried out in a bath containing 2 N caustic soda, in aqueous solution, at a temperature of approximately 70° C., for approximately 30 min.

14. The method according to claim 12, wherein the chemical etching bath further comprises an organic solvent.

15. The method according to claim 13, wherein the chemical etching bath further comprises an organic solvent.

16. The method according to claim 14, wherein the organic solvent is selected from the group of methanol, ethanol and isopropanol.

17. The method according to claim 15, wherein the organic solvent is selected from the group of methanol, ethanol and isopropanol.

18. The method according to claim 1, wherein the chemical etching is carried out in the presence of a surfactant.

19. The method according to claim 1, further comprising microporous films obtained after chemical etching, the microporous films being washed until neutralisation of the pH, rinsed and dried.

20. The method according to claim 19, wherein the washing of the microporous films is carried out in an aqueous solution of acetic acid at approximately 15%, at a temperature of approximately 70° C. for approximately 15 minutes; then in demineralised water, at a temperature of approximately 700° C., for approximately 15 minutes and more, until a neutral pH is obtained.

21. A method according to claim 1 being carried out continuously.

* * * * *